INVENTORS
Pasqual C. Tulumello
and Domenico Franceschi
by Thomas P. Mahoney

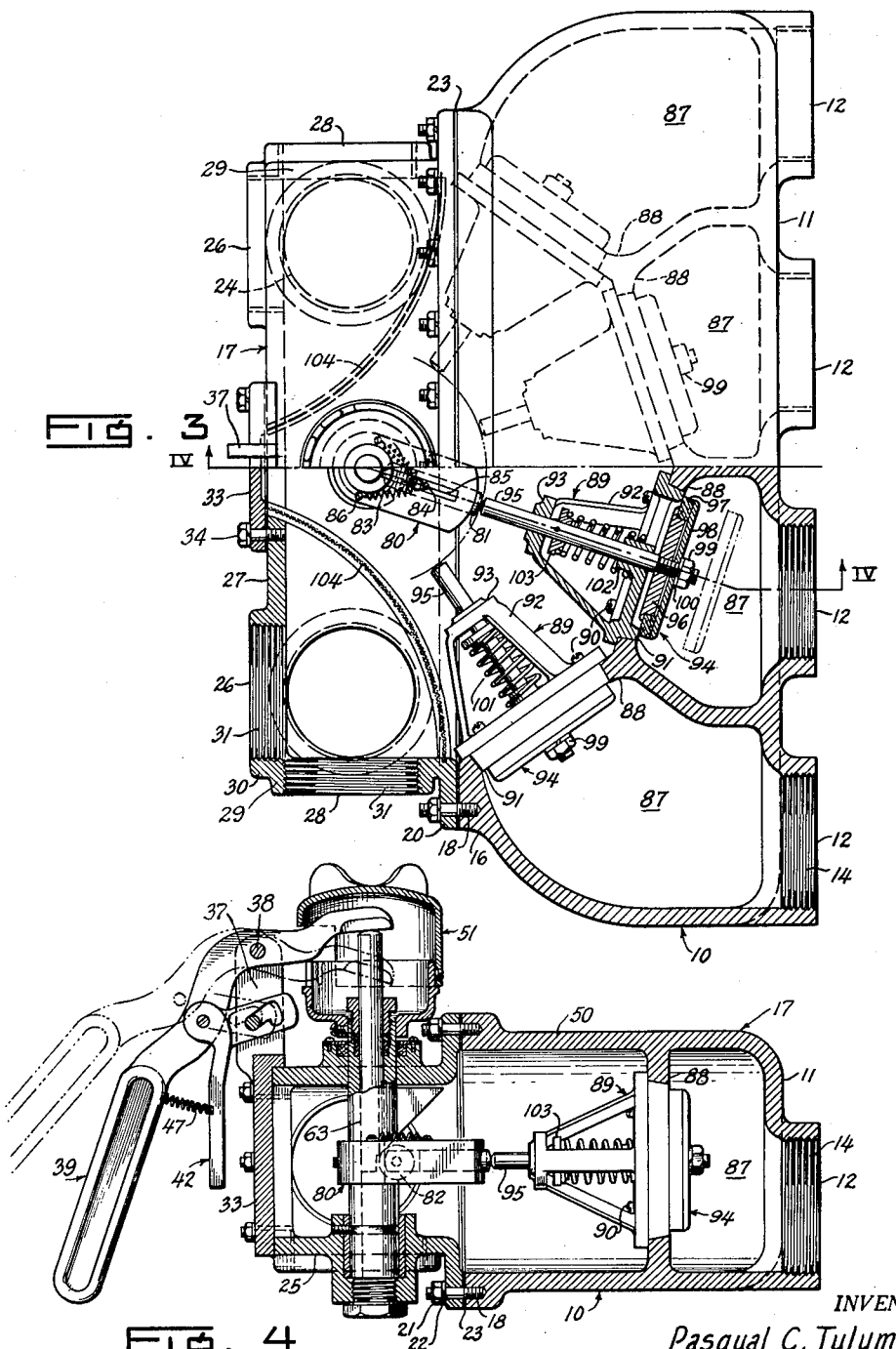

Patented May 26, 1953

2,639,729

UNITED STATES PATENT OFFICE 2,639,729

VALVE SELECTOR AND ACTUATOR FOR FLUID FLOW MANIFOLDS

Pasqual C. Tulumello, Los Angeles, and Domenico Franceschi, Alhambra, Calif.

Application April 29, 1946, Serial No. 665,840

1 Claim. (Cl. 137—635)

This invention relates to improvements in fluid discharge manifolds and more particularly to that type of liquid discharge manifold adapted to selectively evacuate the contents of a plurality of fluid containing tanks or cells.

Fluid discharge manifolds of this type are used extensively in the petroleum fuels industry and are usually associated with tank trucks or trailers having embodied therein a plurality of fuel cells or tanks each of which may contain a different type of fuel consigned to different destinations. Thus the need for a light weight fluid discharge manifold which is designed to permit the selective discharge of the contents of the various fuel tanks or cells can readily be seen. Previously, there has been provided a variety of such manifolds designed to permit the selective unloading of liquid carriers. However, the problems engendered by the size, weight and inefficiency of these manifolds have been considerable ones.

For instance, the average present day fluid discharge manifold, when operated on gravity feed alone, which means that the fluid being discharged from the tank flows freely and is not pumped through the meter, creates a considerable amount of back pressure, thus impeding the flow of the fluids and prolonging the period of time required to drain any specific tank. In addition, the construction of manifolds in the prior art has been such that the pipes leading from the tanks to the manifold have had to be disposed in a number of planes, as about the circumference of a circle, despite the fact that the pipes all originate on a horizontal line and in the same plane, thus causing the installation of extra lengths of piping and the use of numerous elbows and other similar hardware.

Further, the installation of the prior art fluid discharge manifolds has been a difficult and time consuming matter requiring a disproportionate consumption of time. Conversely, when the need for repairs arises the difficulties involved in the removal of the manifolds and the substitution of parts are considerable. Of course the bulk and shape of prior art manifolds and their installation about the already crowded frame of a tank truck or trailer is also another factor adding to the cost of installation and removal.

It is, therefore, an object of this invention to provide a fluid discharge manifold so designed and so constructed that the fluid being discharged therethrough will flow in an unimpeded path with a minimum of back pressure and a maximum of speed.

It is another object of this invention to provide a manifold for the discharge of fluids which has its inlet orifices so disposed that it may be readily attached to the pipes leading from the tanks and will receive them in the same plane, thus avoiding considerable installation expense.

A further object of this invention is the provision of a fluid discharge manifold which is provided with a selector means adapted to select the tank to be emptied and a discharge handle means adapted to unseat the manifold valve, both selector means and discharge means being designed to serve selectively a plurality of tanks.

An additional object of this invention is the provision of a fluid discharge manifold having strainer means embodied therein and adapted to prevent the discharge of foreign bodies into the meter or fluid storage tanks.

Another object of this invention is the provision of a fluid discharge manifold so constructed that the major portion of the fluid which passes therethrough will be discharged therefrom, thus preventing the dangerous accumulation of loose fluid in the manifold, when combustible fluids are discharged.

A further object of this invention is a manifold which may be expeditiously installed and quickly removed for repair.

Other objects and advantages of the present invention will be made more apparent by a consideration of the appended specification and the accompanying drawings, in which, Fig. 1 is a perspective view of an embodiment of the present invention;

Fig. 3 is an incomplete top plan view of the invention, partly in section and partly in elevation, and Fig. 4 is a vertical sectional view of the invention taken on line IV—IV of Figure 3.

Figure 1:
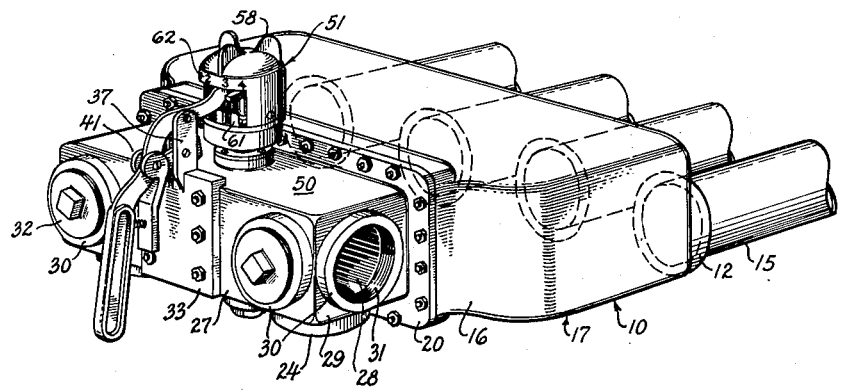
Figure 2:
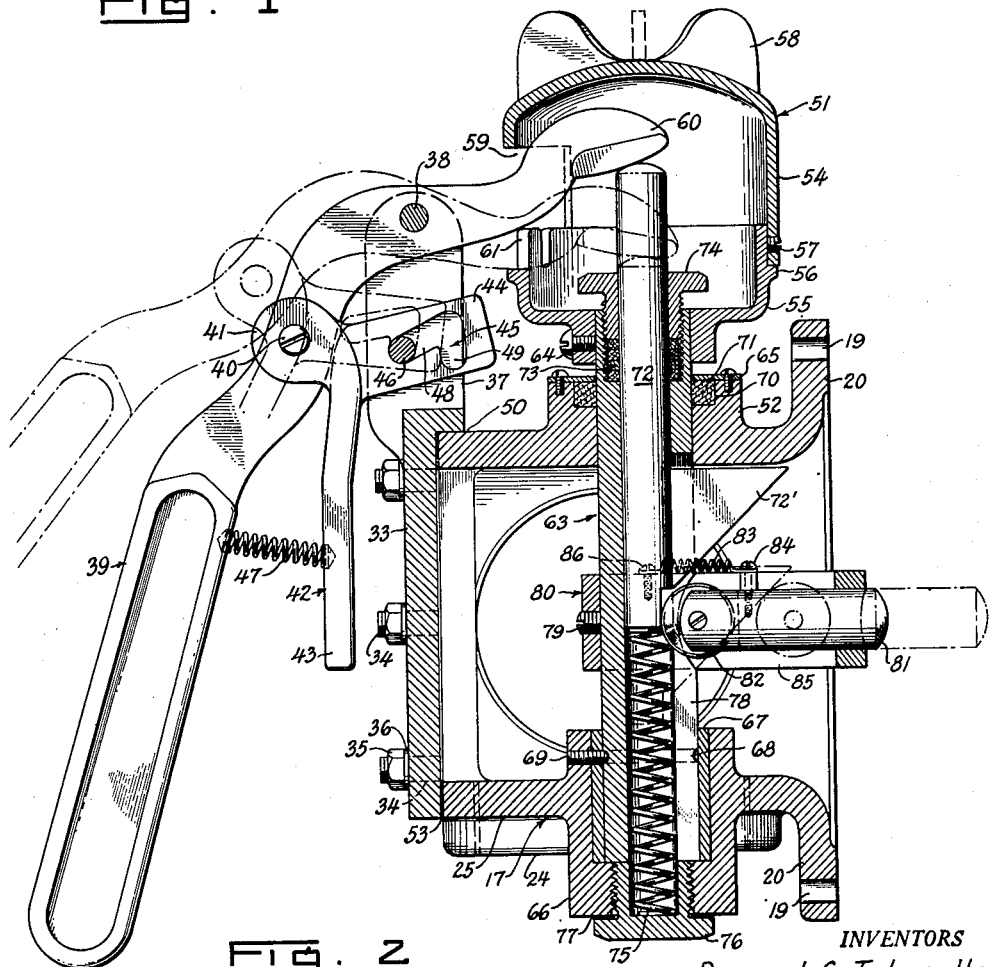
Fig. 2 is a detail view of the selector and discharge mechanism as shown in Figure 4.

A fluid discharge manifold constructed in accordance with the present invention, as shown in the drawings, comprises an enclosure constituted of a flat, generally rectangularly shaped main chamber or housing 10 and a smaller, generally rectangularly shaped discharge chamber or housing 17. Located in the rear wall 11 of the chamber 10 and communicating with the interior thereof are a plurality of orifices 12 which are spaced at substantially the same distance from each other and the diametric centers of which lie in the same general horizontal plane. The orifices 12 are provided with threaded portions 14 which permit the ends of pipes or tubing 15 to be readily attached therein. Since the orifices 12 are arranged in the rear wall 11 of the chamber 10 in substantially the same horizontal plane it is obvious that the pipes 15 connected thereto are adapted to run into the manifold parallel to each other, thus eliminating the necessity for the bending of the pipes 15 or the provision of elbows and similar expedients.

There is mounted on the forward wall 16 of the main chamber or housing 10 a smaller generally rectangularly shaped discharge chamber or housing 17, which is fixedly attached to the main chamber or housing 10 by means of studs 18 driven into the forward wall 16 of the main housing 10 and passing through holes 19 drilled, cast or otherwise formed in the rectangular flange 20 which runs about the housing 17. Nuts 21 and lock washers 22 mounted on studs 18 serve fixedly to maintain the chamber 17 on the main chamber or housing 10. Between the rectangular flange 20 and the main housing 10 there is placed a gasket 23 which is designed to prevent the leakage of fluid from the joint which exists between the rectangular flange 20 and the main housing 10.

The smaller housing or discharge chamber 17 has a number of orifices or openings which penetrate into its interior, there being two discharge orifices 24 located in its bottom wall 25, two orifices 26 located in its front wall 27, and one orifice 28 located in each of the side walls 29. The openings 24, 26 and 28 are each surrounded by an annular ring 30 which has machined or otherwise formed in the interior surface thereof a threaded portion 31 which is adapted to receive plugs 32 or pipes (not shown) leading to a meter or fuel storage tank (not shown). There is located on the front wall 27 of the smaller chamber a cover plate 33 which covers an access opening in the front wall 27 and which is maintained thereupon by means of studs 34 embedded in the front wall 27, nuts 35 and lock washers 36 mounted on studs 34. A gasket 53 is placed between the plate 33 and the front wall 27 to prevent leakage therebetween.

There are formed integrally with the upper edge of the cover plate 33 and projecting vertically therefrom two spaced apart supporting members or mounting bosses 37, which are adapted to mount therebetween as on a pin 38 a discharge handle or means 39 designed to rotate in a limited arc on pin 38. Movably mounted on the discharge handle 39 as by means of a screw 40 running through said handle 39 are two ears 41 provided by a locking lever or member 42. The locking lever 42 is roughly of L-shaped configuration and has the mounting ears 41 located at the right angle where the depending leg portion 43 and the inverted base portion 44 of the L meet. Stamped, cast or otherwise formed in the inverted base portion 44 is an inverted V-shaped locking slot 45 comprising two segments 48 and 49 which is adapted to cooperate with a fixed locking pin 46 mounted in and extending between the supporting members 37. An expansion spring 47 biases the dependent leg portion 43 of the locking lever 42 away from the handle 39, both ends of spring 47 being positioned and retained in sockets in handle 39 and locking lever 42. Thus, when the discharge handle 39 is in the "off" position or, in other words, when no fluid is being discharged from the manifold, the spring 47 forces the segment 48 of the locking slot 45 into contact with the pin 46 by forcing the depending leg portion 43 of the locking lever to the right. When the handle 39 is moved to the "on" or discharge position the locking pin 46 is engaged with segment 49 of locking slot 45, thus keeping the handle 39 in the "on" or discharge position until it is deliberately released.

Associated with the top wall 50 of the discharge chamber 17 is a selector mechanism 51 which is rotatably mounted in an annular boss 52 projecting upwardly from the top wall 50. The selector mechanism 51 is adapted to cooperate with the discharge handle 39 and is therefore located directly to the right, as seen in the drawings, of said discharge handle. The selector mechanism 51 comprises a cylindrical cap or control member 54 which is associated with a mating-base portion 55 having a flange 56 against which the rim of the cap 54 is adapted to rest and be affixed thereto, as by means of set screws 57. Located on the crown of the cap 54 are vertical spaced wings 58 by means of which the cap 54 is adapted to be rotated. An opening 59 in the front of the cap 54 permits the entrance of the upper portion 60 of the discharge handle 39 into the interior of the cap 54. Formed in the front side of the base portion 55 and immediately below the opening 59 are vertical, spaced apart, tooth-like members 61 which serve to properly index the selector mechanism 51. Indicia 62 disposed above the opening 59 on the front face of the cap 54 permit the visual selection of the tank whose contents are to be discharged through the manifold.

Projecting upwardly from the interior of the discharge chamber 17 is a tubular member 63 which rotatably supports the base portion 55 and its associated cap portion 54. The base portion 55 is retained upon the tubular member 63 by means of screw 64. A cover plate 65 fastened to the boss 52 surrounds the periphery of the tubular member 63. The lower end of tubular member 63 is positioned for rotatable motion in a boss 66 which projects from the bottom wall 25 of the discharge chamber 17. The boss 66 also projects upwardly into the interior of the chamber 17 and has a sleeve 67 placed therein to facilitate the rotary motion of the tubular member 63. An annular groove 68 cut into the periphery of the tubular member 63 receives a set screw 69 which passes through boss 66 and sleeve 67, projecting thereinto, thus preventing both the sleeve 67 and the tubular member 63 from being vertically displaced.

Deposited in an annular recess 70 in the boss 52 and retained therein by means of the cover plate 65 is a seal 71 which is designed to prevent the leakage of fluid around the tubular member 63. Extending vertically into the interior of the cap 54 from the interior of the chamber 17 through the tubular member 63 is a rod or shaft 72 which is adapted to contact the upper portion 60 of the discharge handle 39. Packings 73 situated in tubular member 63 are held about the periphery of the rod or shaft 72 by means of a packing nut 74 thus preventing fluid leakage from the interior of chamber 17. The rod 72 is continually and firmly biased against the upper portion 60 of the discharge handle 39 by means of an expansion spring 75 located within the lower part of the tubular member 63 and seated in a hollow nut 76 which caps the bottom of the boss 66 and has a gasket 77 between itself and the boss to prevent leakage therebetween.

Into the side of the tubular member 63 which faces toward the main chamber 10 there is cut a slot 78 from which projects a triangular segment 72¹ or cam carried on the rod 72. Mounted on the tubular member 63 by means of set screw 79 and adapted to rotate therewith is a horizontally extending arm 80 which projects into the interior of the main housing 10 for a short distance. A cylindrical pin 81 is slidably maintained within a bore created in the arm 80 and has mounted in a slot cut into its inner end a wheel or roller 82. The pin 81 is retained within the bore of the arm 80 by means of springs 83 which are attached at their outer end to the upper circumference of the pin 81 by a screw 84 which runs through a slot 85 cut into the upper portion of arm 80 and running into the bore in which runs pin 81. The springs 83 are fastened at their inner ends to the arm 80 by means of screws 86.

It can be seen, therefore, that the retracted pin 81 is adapted to be swung in an arc within main housing 10 (as shown in Figure 3) since the pin 81 is mounted in the arm 80 which is in turn affixed so that it is adapted to be rotated by means of the tubular member 63 when the latter is revolved through its connection with the selector cap 54.

There are spaced within the main housing 10 a plurality of chambers 87 which are so constructed and designed as to lie substantially in the same plane so that the flow of fluids therethrough is a substantially constant one, with the consequent elimination of back pressures which would unnecessarily prolong the passage of fluid through the manifold. Thus a full and unimpeded flow of the fluids being discharged through the manifold is achieved, considerably hastening the discharge of the fluids. The inner limits of the chambers 87 are defined by walls 88 having annular orifices therein and adapted to serve as receptacles for valve assemblies 89 which are pressed into and retained therein by means of scrws or similar fasteners 90.

The valve assemblies 89 comprise an annular seat portion 91 having formed integrally therewith inwardly projecting arms 92 which are adapted to support at their apex an integral annular valve stem supporting collar 93. Seated on the seat 91 is a valve 94 which comprises a stem 95 having a valve head consisting of a circular base member 96 upon which rests an annular seat contacting member 97 made of cork or similar material and a retaining washer 98, the complete assembly being held on the end of the valve stem 95 by means of a nut 99 which is screwed onto threads 100 located on the end of the valve stem 95. The valve head is biased in sealing contact with the seat 91 by means of a spring 101 which seats at its inner end on a centrally located boss 102 and presses against a retaining collar 103 secured on the periphery of the stem 95. The valve assemblies 89 are so designed that the pressure drop of fluid passing therethrough is held at a minimum so that the optimum flow design of the chambers 87 will not be rendered ineffective.

When the discharge of fluid through the manifold is desired the valve (not shown) which permits the flow of fuel from the tank is to be emptied through the discharge manifold of the present invention is opened by turning the tank cover (not shown). The cap section 54 of the selector mechanism 51 is then rotated by means of its wings 58 until the indicia 62 corresponding to the tank to be emptied registers with the top portion 60 of the discharge handle 39 thus permitting the accurate registry of the handle portion 60 with the space between the vertical toothlike members 61. The turning of the cap section 54 has also caused the rotation of the tubular member 63 which turns with it, through the medium of the triangularly shaped segment 72¹ which projects from the slot 78, the rod 72 and the arm 80, thus bringing the cylindrical pin 81 into accurate juxtaposition to the stem 95 of the valve which is associated with the pipe 15 containing the fluid to be discharged. The discharge handle 39 is then raised permitting the upper portion 60 to drop into the space between vertical indexing means 61 and depress the rod 72 against the bias of the spring 75.

The discharge handle 39 is raised until the pin 46 drops into the segment 49 of locking slot 45, permitting the handle to be released and locking it into the "on" or discharge position against the force of the spring 75. Simultaneously, the descent of the triangular shaped cam 72¹ on the rod 72 has caused the cam 72¹ to ride over the wheel 82 and within the slot 85 thus causing the cylindrical pin 81 to be driven outwardly through the arm 80 and to impinge on the end of the valve stem 95, unseating the valve 94 and permitting the flow of fluid into the discharge chamber 17 and thence through whichever orifice in the chamber 17 it is desired to discharge the fluid.

Replaceable curved strainer means 104 extending within the interior of the discharge chamber 17 between the bottom wall 25 and the top wall 50 prevents the discharge of foreign bodies through the orifices in chamber 17. Strainer means such as this are usually provided in a separate assembly because of the difficulty of access to conventional type manifolds. However, the removal of the cover plate 33 will permit the replacement of the strainers or the cleaning out of foreign matter from the discharge chamber 17.

It can readily be seen that there is provided by this invention a fluid discharge manifold adapted to permit the quick discharge of fluids therethrough, which is in addition easy to install and cheap to maintain. It is obvious that the above described construction has been utilized to explain the construction and mode of operation of the invention since changes could be made which would fall within the spirit and scope of the appended claim.

Having thus described the invention, what we claim as new and desire to secure by Letters Patent is:

A cooperative selector and discharge mechanism for use with a fluid discharge manifold to control the flow of fluid therethrough including a rotatable selector means, said selector means including cap means mounted upon the exterior of said fluid discharge manifold upon a selector shaft depending into said manifold and rotatable therein, a discharge means associated with said selector means and whose operation is positively controlled by said selector means, said discharge means including a reciprocable discharge shaft mounted coaxially within said selector shaft, valve means having their longitudinal axes disposed normal to the axis of said shafts, and reciprocable pin means mounted on and adapted to be rotated by said selector shaft to contiguity with one of said valve means and driven into valve opening contact with said valve means by the reciprocation of said discharge shaft, and indexing means comprising means to prevent the actuation of said discharge means until said selector means is accurately registered with said discharge means.

PASQUAL C. TULUMELLO.
DOMENICO FRANCESCHI.

References Cited in the file of this patent

UNITED STATES PATENTS

| Number | Name | Date |
|---|---|---|
| 623,909 | Kaeferle | Apr. 25, 1899 |
| 848,487 | Nishizaki | Mar. 26, 1907 |
| 1,652,845 | Vennum | Dec. 13, 1927 |
| 1,822,346 | Guiles | Sept. 8, 1931 |
| 2,222,704 | Brown | Nov. 26, 1940 |
| 2,257,004 | Fleming | Sept. 23, 1941 |

FOREIGN PATENTS

| Number | Country | Date |
|---|---|---|
| 511,666 | Great Britain | Aug. 22, 1939 |